Nov. 27, 1934.　　M. BOWMAN-MANIFOLD　　1,981,922
PICTURE PROJECTING AND VIEWING APPARATUS
Filed Aug. 15, 1931
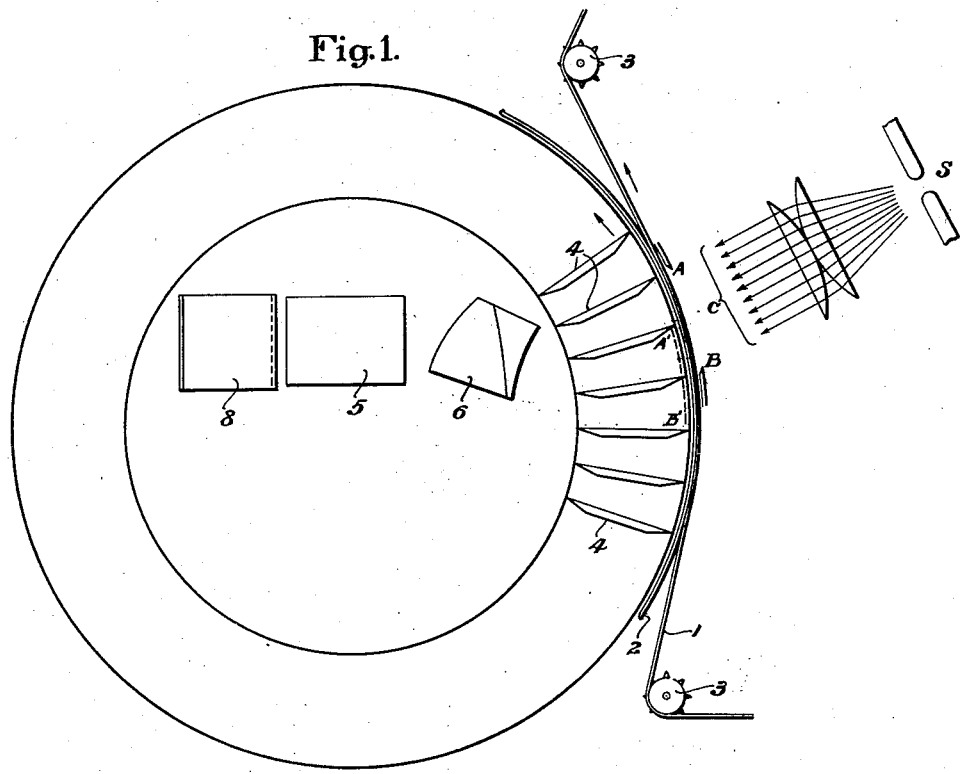
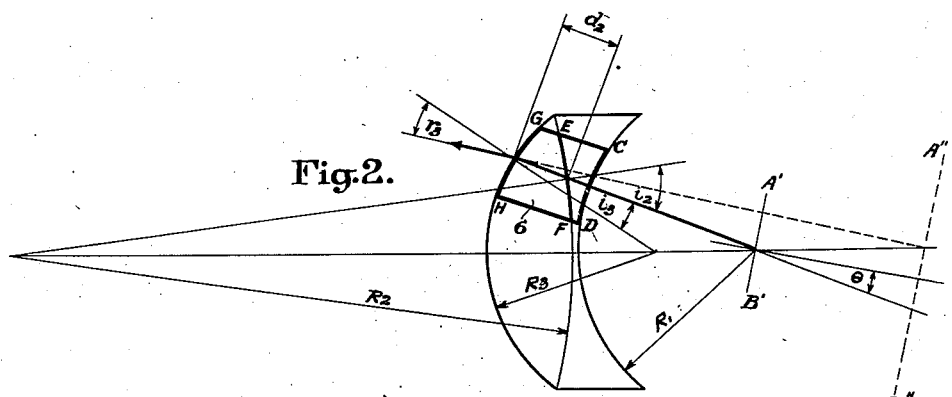
$R_1 = 1.2$ in.　　$i_2 = 28°25'$　　$\theta = 14°$
$R_2 = 4.68$ in.　　$i_3 = 13°12'$　　$n = 1.61$
$R_3 = 1.096$ in.　　$r_3 = 21°34'$　　$d_2 = 0.35$ in.
Total glass path = 0.5 in.
INVENTOR.
Michael Bowman-Manifold,
BY J. R. Goldsborough
HIS ATTORNEY.

Patented Nov. 27, 1934

1,981,922

UNITED STATES PATENT OFFICE 1,981,922

PICTURE PROJECTING AND VIEWING APPARATUS

Michael Bowman-Manifold, Worplesdon Station, England, assignor to Electric and Musical Industries Limited, Hayes, Middlesex, England, a company of Great Britain Application August 15, 1931, Serial No. 557,286
In Great Britain August 23, 1930

6 Claims. (Cl. 88—16.8)

The present invention relates to photographic cameras and picture projecting and viewing apparatus.

In known projecting apparatus, rays of light are passed through a picture film in a mean direction which is normal to the film, and by means of a suitable optical system an image of the film is projected upon a viewing screen which is placed normally to the mean direction of the rays incident upon the screen. In such apparatus, all lenses which comprise the optical system are disposed symmetrically and normally about the axis of projection of the light rays.

If, however, the light rays pass through the film obliquely, as may be necessary in some cases, no ordinary lens which is disposed normally to the mean direction of the light rays can form an image of the film which is in focus all over. Similarly, if the light rays pass through the film normally and it is desired to form an image of the film in a plane which is oblique to the light rays, this cannot be effected satisfactorily by means of an ordinary lens disposed normally to and symmetrically about the axis of projection of the light rays.

In order to correct the above described lack of even focus of the image, which may be called the "obliquity error" of the image, it has been proposed to provide, between the object and its image, a prism or an achromatic combination of prisms of such dimensions and orientations that the image lies substantially in even focus. Since, however, the prism or prisms must be placed close to the object or image in order to produce a satisfactory image, the use of such devices is very limited.

It is an object of the present invention to provide means for correcting the above described obliquity error of the image in cases where the correcting members cannot be placed close to the object or image.

According to the present invention, in photographic, picture projecting, picture viewing or the like apparatus, in which the path of the light between the object and its image, leaves the object or reaches the image, or both, other than normally, there is provided in the path of the light between the object and image, a lens or combination of lenses adapted to refract the light in such a manner as to permit of the formation of a substantially evenly focussed image of said object.

The invention will now be described, by way of example, as applied to a type of projector in which it has been found to be of particular advantage, and reference will be made to the accompanying drawing, in which Fig. 1 illustrates, diagrammatically, the position of the obliquity correcting members relative to the essential parts of the projector, and Fig. 2 illustrates, also diagrammatically, the path of the light rays, through the obliquity correcting members, from the object to the image.

Referring to Fig. 1, in the type of projector under consideration, a film 1 is passed at a uniform speed over a cylindrical guide drum 2 by means of suitably disposed driving sprockets 3 and is illuminated, while passing the gate AB, in an oblique direction, with white light emanating from a suitable source S and indicated by the arrows at c. Light passed through the moving film at AB forms, by reflection by radial mirrors 4, a virtual image at A'B' (shown dotted). The radially disposed plane mirrors 4 move in the same direction as and with half the angular velocity of the film 1, and therefore the image A'B' remains stationary on the circumference of the drum. Light from this stationary virtual image passes into the central space within the radial mirrors 4. It will be clear that since the film 1 is illuminated obliquely, light must also proceed obliquely from the stationary image A'B' (which hereinafter will be called the object). According to the present invention, therefore, an achromatic combination of lenses 6 is arranged between the radial mirrors 4 and a projection lens 5, the dimensions and orientations of the separate lenses being such that a substantially evenly focussed uncolored image of the object may be formed in a plane normal to the mean direction of the rays leaving the lens combination 6.

In order that the final beam which emerges from the lens 5 may not be partially obstructed by the radial mirrors 4, a plane mirror inclined at 45° to the axis of the lens 5 is placed in the position indicated by 8.

The path of the rays through the lens combination 6 is illustrated in Fig. 2.

It is assumed that the film moves along the chord of the arc along which it actually moves and that therefore the object A'B' lies in a plane. The errors introduced by this assumption are small, since the radius of the circle around which the film moves is large compared with the length of a single picture on the film.

Rays of light from the object A'B' leave the object obliquely and pass through the first two surfaces of the lens combination 6 substantially without refraction. At the third or back surface of the lens combination the rays are refracted so as to form a virtual image A″B″ in a plane normal to the direction of the rays leaving the third surface. An image of A″B″ is projected, by means of the achromatic projection lens (indicated by 5 in Fig. 1) onto a suitably placed viewing screen (not shown).

Rays from the center point of the object A′B′ leave the object at an angle $\theta$ with the normal to the object, and strike the nearest (or first) surface CD of the lens combination normally. That is to say, the center of curvature of the first surface is coincident with the center point of the object. There is thus no refraction at this surface.

The two parts of the lens combination are made of glasses of approximately the same refractive indices and there is thus little refraction at the interface EF. The dispersions of the two glasses are, however, different, in order that the dispersion which occurs at the third surface GH of the lens combination may be neutralized, and the final image thus formed in an uncolored condition.

The ray from the center point of the object A′B′ strikes the third surface GH obliquely at an angle $i_3$ with the normal to that surface, and emerges from the surface GH at an angle of refraction $r_3$. It is by refraction at this surface alone that the final image A″B″ is formed in a plane normal to the rays leaving the lens combination.

It is well known that a pencil of rays of light incident obliquely on a spherical surface in general becomes astigmatic, the only exception being when the focus of the pencil is on an aplanatic sphere, and therefore, to avoid astigmatism, of the central rays at least, the third surface GH must be so chosen that the center point of the object A′B′ lies on its aplanatic sphere. That is to say, if the radius of curvature of the third surface GH is $R_3$ and the refractive index of the glass N, then the center point of the object must lie on a sphere, concentric with the third surface, of radius $R_3/N$ and on the side of the center remote from the refracting surface GH.

In order that the final image A″B″ may be formed in a plane normal to the rays emergent from the lens combination 6, the relation between the angles of incidence and refraction at the surface GH, and the angle of obliquity $\theta$ must satisfy the following equation:

$$\tan \theta = \tan r_3 - \frac{\tan i_3}{N}$$

If desired, the correction for obliquity may be carried out by a refraction at the front surface CD of the lens combination. In this case, the rays from the center point of the object must, of course, strike the first surface obliquely and the relation between the angles of incidence and refraction ($i_1$ and $r_1$ respectively) at the first surface, and the angle of obliquity $\theta$, is expressed by the equation:

$$\tan \theta = \tan r_1 - N \tan i_1$$

In this case, also, to avoid astigmatism of the central rays, the first surface CD is so chosen that the center point of the object lies on a sphere of radius $R_1 N$ concentric with the refracting surface CD, where $R_1$ represents the radius of curvature of the first surface CD.

The correction may also be carried out in more than one stage by the use of successive oblique spherical surfaces, each separately satisfying the aplanatic condition for its own object.

It will be apparent that, at whichever surface the correction is made, dispersion of deviation and focus must occur, and this is corrected by known methods of color correction of lenses. For the case when the refractive indices of the two glasses of the lens combination are nearly equal and refraction occurs at the emergent surface GH only, the condition that the central rays for both ends of the spectrum should emerge from the same virtual image point is contained by the following equation:

$$\cot i_3 = \cot i_2 \frac{dN_2 - dN_1}{dN_2}\left[1 - \frac{d_2}{R_3}\left\{\sec i_3 + \frac{\cos^2 r_3}{N \cos^2 i_3}\left(\frac{1}{N \cos i_3 + \cos r_3} - \sec r_3\right)\right\}\right]$$

where N represents the mean of the two refractive indices.

$dN_1$ represents the difference of the refractive indices of the first glass for the C and F Fraunhofer lines in the spectrum.

$dN_2$ represents the difference of the refractive indices of the second glass for the C and F Fraunhofer lines in the spectrum.

$i_2$ represents the angle of incidence at the interface.

$i_3$ represents the angle of incidence at the emergent surface.

$d_2$ represents the distance between the interface and emergent surface along the central ray.

$R_3$ represents the radius of curvature of the emergent surface.

$r_3$ represents the angle of refraction at the emergent surface.

The images formed by rays at both ends of the visible spectrum will not be laterally displaced provided that the lens is constructed in accordance with the last equation given above. In order that these images should be in focus at the same distance from the lens, the center of curvature of the interface is made collineal with the centers of curvature of the other two faces.

By a suitable choice of the position and relative thicknesses of the component parts of the lens, the proportional error between the magnifications produced by rays from the two ends of the visible spectrum (say, for example, by wave lengths of the C and F Fraunhofer lines) may be reduced to one part in about two thousand for an object which is the size of a picture on an ordinary film.

The dimensions of a lens combination which may be used in a cinema projector of the type described with satisfactory results will now be given.

The angle of obliquity $\theta$ is 14°. The distance of the center point of the object A′B′ from the first lens surface is 1.2 inches, and this, therefore, is the radius of curvature ($R_1$) of the first surface. The radius of curvature ($R_2$) of the second surface is 4.68 inches and of the third surface ($R_3$) is 1.096 inches. The curvature of the interface is opposite to that of the other two surfaces. The angle of incidence on the first surface ($i_1$) is zero, on the second surface ($i_2$) is 28° 25′, and on the third surface ($i_3$) is 13° 12′. The angle of refraction at the second surface ($r_2$) is equal to the angle of incidence ($i_2$) at that surface and the angle of refraction at the third surface ($r_3$) is 21° 34′.

The mean refractive index of the two glasses is 1.61 and the dispersions of the first and second lenses are 37.0 and 57.2, respectively, where V, the dispersion, is equal to $$\frac{n-1}{n_b - n_r},$$

$n_r$ and $n_b$ representing the refractive indices of the two extreme rays for which correction is to be made and $n$ representing the mean refractive index over the same range. The total glass path is 0.5 inch, the distance $d_2$ is 0.35 inch, and the effective focal length of the combination of lenses 5 and 6, when the focal length of the former is 3.5 inches, is 2.17 inches.

Although the invention has been described as applied to a particular form of projector, it will be evident that it may be applied to any apparatus in which the path of the light between the object and image, leaves the object, or reaches the image or both, other than normally, and in which it is desired to form an evenly focussed uncolored image.

Should it be considered not necessary to correct the dispersion which occurs at the refracting surface, the obliquity correction may, of course, be achieved by the use of a single lens.

Although I have shown and described a certain specific embodiment of my invention, I am fully aware that many modifications thereof are possible. My invention, therefore, is not to be restricted except insofar as is necessitated by the prior art and by the spirit of the appended claims.

I claim as my invention:

1. In moving picture apparatus of the type wherein the path of light between the object and its image is other than normal to either one of them, a correcting prism interposed in said light path between the object and the image for refracting the light, said prism comprising an achromatic combination of lenses, the entrant surface of the first lens having its center of curvature coincident with the center point of the object, said lenses having substantially the same refractive indices whereby light passes through their adjacent surfaces with substantially no refraction, and the emergent surface of the second of said lenses having a curvature extending in the same general direction as said entrant surface, but having its center located at a point between the curvature of said entrant surface and the said center point of the object.

2. The invention set forth in claim 1 characterized in that the radius of curvature of the entrant surface of the first lens is greater than the radius of curvature of the emergent surface of the second lens.

3. The invention set forth in claim 1 characterized in that the adjacent surfaces of the two lenses have a curvature opposite to that of the entrant and emergent surfaces of the prism.

4. The invention set forth in claim 1 characterized in that the adjacent surfaces of the two lenses have a curvature opposite to that of the entrant and emergent surfaces of the prism, and characterized further in that the radius of curvature of said adjacent surfaces is greater than the radii of curvature of said entrant and emergent surfaces.

5. In moving picture apparatus of the type wherein the path of light between the object and its image is other than normal to either one of them, a correcting prism interposed in said light path between the object and the image for refracting the light, said prism comprising an achromatic combination of lenses and being of such a character and so disposed in the light path that, for rays passing from the center point of said object, refraction occurs at only the emergent surface of said lens combination, and wherein the relation between the angles of incidence and refraction at the emergent surface and the angle of obliquity satisfies the equation $$\tan \theta = \tan r - \frac{\tan i}{N}$$

where
 $\theta$ is the angle of obliquity,
 $r$ is the angle of refraction of the central rays at the emergent surface of the lens combination,
 $i$ is the angle of incidence of the central rays at the emergent surface of the lens combination, and $N$ is the refractive index of the lens having the emergent surface of the lens combination.

6. In moving picture apparatus of the type wherein the path of light between the object and its image is other than normal to either one of them, a correcting prism interposed in said light path between the object and the image for refracting the light, said prism comprising an achromatic combination of lenses and being of such a character and so disposed in the light path that, for rays passing from the center point of said object, refraction occurs at only the entrant surface of said lens combination, and wherein the relation between the angles of incidence and refraction at the entrant surface and the angle of obliquity satisfies the equation $$\tan \theta = \tan r - N \tan i$$

where
 $\theta$ is the angle of obliquity,
 $r$ is the angle of refraction of the central rays at the entrant surface of the lens combination,
 $i$ is the angle of incidence of the central rays at the entrant surface of the lens combination, and $N$ is the refractive index of the lens having the entrant surface of the lens combination.

MICHAEL BOWMAN-MANIFOLD.